United States Patent [19]

Sell et al.

[11] 4,333,444
[45] Jun. 8, 1982

[54] SOLAR POWERED ICE MELTER FOR ROOFS

[75] Inventors: Roger I. Sell, 4824 W. 99th St., Bloomington, Minn. 55437; Irving W. Sell, Minneapolis, Minn.

[73] Assignee: Roger I. Sell, Bloomington, Minn.

[21] Appl. No.: 137,251

[22] Filed: Apr. 4, 1980

[51] Int. Cl.³ .................................................. F24J 3/02
[52] U.S. Cl. .................................. 126/417; 126/450; 165/47; 165/67
[58] Field of Search .................... 126/417, 449, 450; 165/47, 67; 52/94, 95, 96

[56] References Cited

U.S. PATENT DOCUMENTS

| | | | |
|---|---|---|---|
| 3,207,211 | 9/1965 | Winterfeldt | 126/417 |
| 3,366,168 | 1/1968 | Dale | 126/417 |
| 4,019,494 | 4/1977 | Safdari | 126/449 |
| 4,076,016 | 2/1978 | Phillips | 126/438 |
| 4,108,156 | 8/1978 | Sitter | 126/418 |
| 4,128,095 | 12/1978 | Oren | 126/449 |
| 4,141,338 | 2/1979 | Lof | 126/449 |
| 4,141,339 | 2/1979 | Weinstein | 126/449 |
| 4,224,923 | 9/1980 | Wells | 126/417 |
| 4,261,417 | 4/1981 | Tingley | 126/417 |

Primary Examiner—Daniel J. O'Connor
Attorney, Agent, or Firm—Kinney, Lange, Braddock, Westman and Fairbairn

[57] ABSTRACT

A solar collector having a housing of convenient size to be installed onto a roof top of a building adjacent the edges of the roof to transfer heat directly to an exterior conductor rib of the collector that melts ice and snow. The collector has an absorber plate exposed to a source of radiant energy, such as the sun, for absorbing the energy and converting it to heat which is conducted to the conductor rib on the exterior of the collector. The conductor rib on the exterior of the collector provides a concentrated amount of heat along a relatively narrow path to melt a channel in ice and snow on the roof and thus provide a drain channel to prevent water from backing up under the shingles and damaging the interior of the building.

12 Claims, 9 Drawing Figures

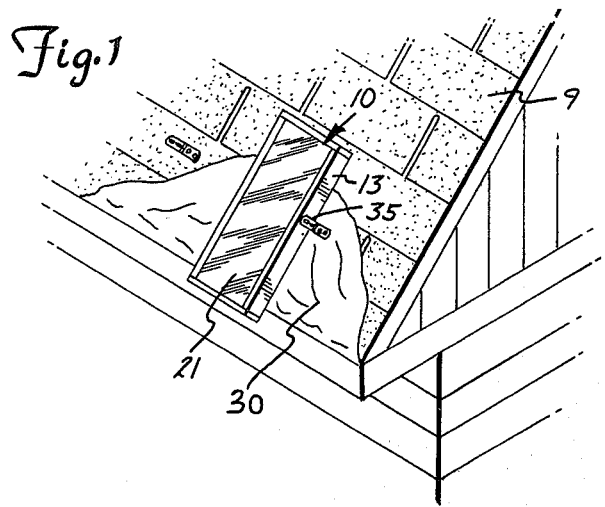
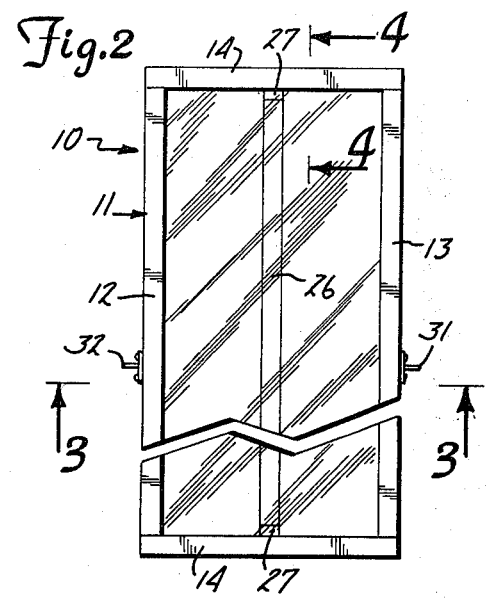
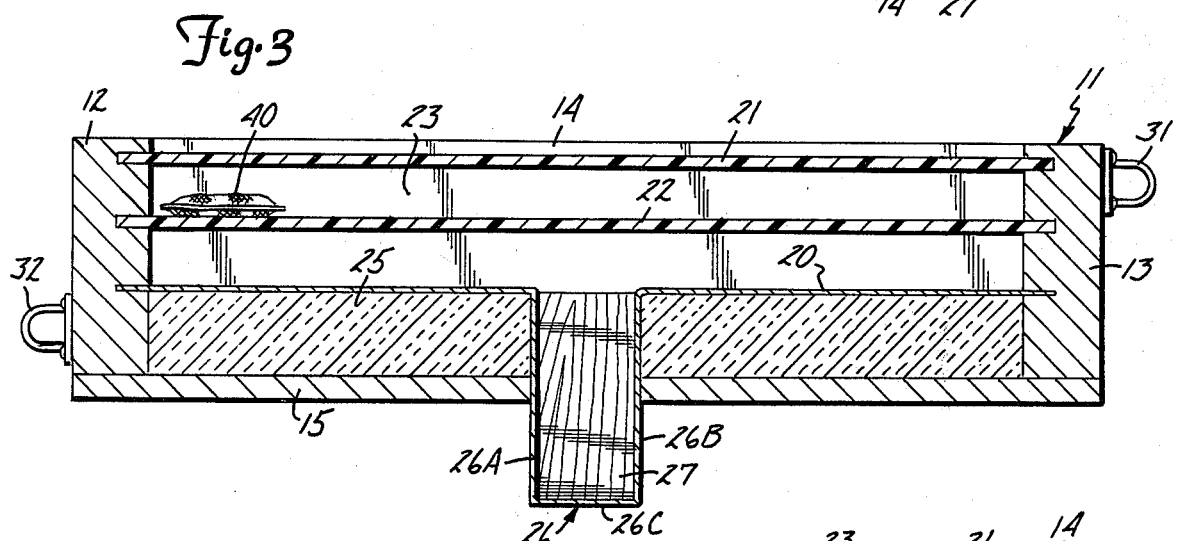
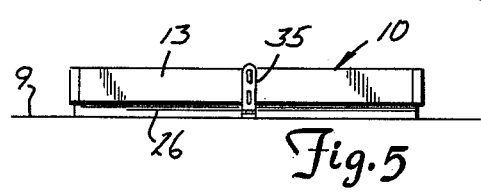
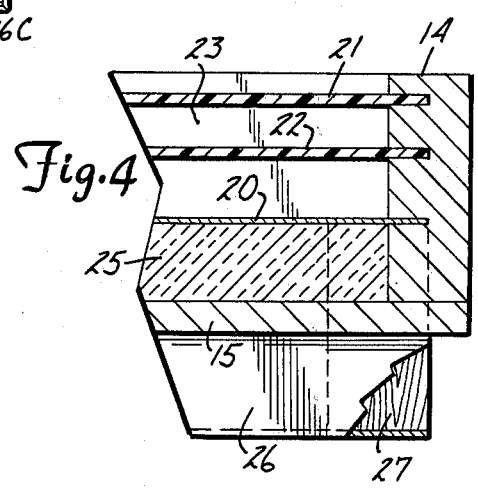
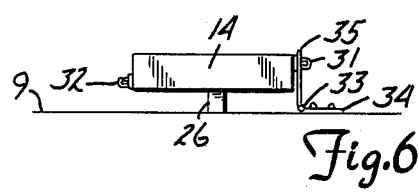
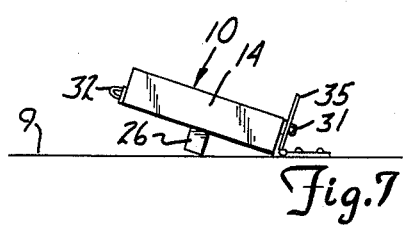
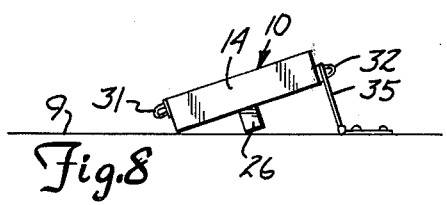

1

SOLAR POWERED ICE MELTER FOR ROOFS

BACKGROUND OF THE INVENTION

1. Field of the Invention

The present invention relates to solar collectors for melting ice and snow on a surface, such as a roof.

2. Prior Art

Various types of solar collector assemblies have been utilized in the past to collect solar energy, and use it for such things as heating water, or rooms. These collectors employ known principles to permit absorption of solar energy, converting it to heat and then the heat is transferred to a liquid or gas, such as water or air, which is then circulated to the desired location for either storage or use.

The problem with ice or snow build-up on roofs, particularly in the area of the roof overhang is recognized in the northern portions of the United States. After a snowstorm, the snow will tend to melt in warmer areas of the roof and water will run down the roof toward the overhang areas. Because there is no heated area under the overhang, this water will freeze causing ice to build up. Eventually as alternate thawing and freezing occurs, a substantial ridge of ice will build up to form an ice dam, and water will tend to back up behind this ridge, leak under the shingles and into the building. Various attempts to solve the problem have advanced, such as electric heating cables, or other electric heaters to melt the build-up.

One type of heater for roof tops has utilized a metal tube that lays on the roof generally perpendicular to the edge line of the roof. An electric heating element is positioned in the tube and the heating element conducts heat to the tube to melt a channel in the ice or snow and permit water that has melted higher up on the roof to drain through.

SUMMARY OF THE INVENTION

The present invention relates to a solar collector having an absorber plate exposed to receive solar radiation.

Means are provided to conduct the heat from the absorber to a conductor rib or element that extends to the exterior of the solar collector. As shown, portions of the absorber plate itself form the means to conduct heat to the rib. The conductor rib or element thereby transfers heat from the absorber plate to melt snow or ice that has accumulated adjacent the solar collector assembly. The solar collctor is designed to be mounted on a surface, for example, adjacent the edges of a roof, to utilize solar energy for melting roof ice, and in particular to provide a channel through ridges of ice formed along the edges of a roof to thereby permit water melting from the roof to drain off.

The collector, as shown, is made so that the absorber plate may be made in suitable lengths and widths and can be provided for different roofs. The collector can be anchored to the roof in any desired manner, and in particular as shown, has means for attaching in a manner that permits it to be positioned so that the absorber plate is generally parallel to the roof, or is tilted in one direction or the other to make sure that maximum amount of solar energy is collected.

BRIEF DESCRIPTION OF THE DRAWINGS

FIG. 1 is a fragmentary perspective view of a roof section showing a solar powered ice melter made according to the present installed thereon;

FIG. 2 is a top plan view of the ice melter of FIG. 1;

FIG. 3 is a sectional view taken as on line 3—3 in FIG. 2;

FIG. 4 is an enlarged sectional view taken as on line 4—4 in FIG. 2;

FIG. 5 is a side elevational view of the device shown in FIG. 1 installed on the roof;

FIG. 6 is an end view of the device of FIG. 5;

FIG. 7 is an end view taken on the same line of sight as FIG. 6 showing the device of the present invention inclined in a first direction;

FIG. 8 is an end view showing the device of the present invention turned 180° from that shown in FIG. 7 and inclined at a desired opposite angle from that shown in FIG. 7.

DESCRIPTION OF THE PREFERRED EMBODIMENTS

Figure 9:
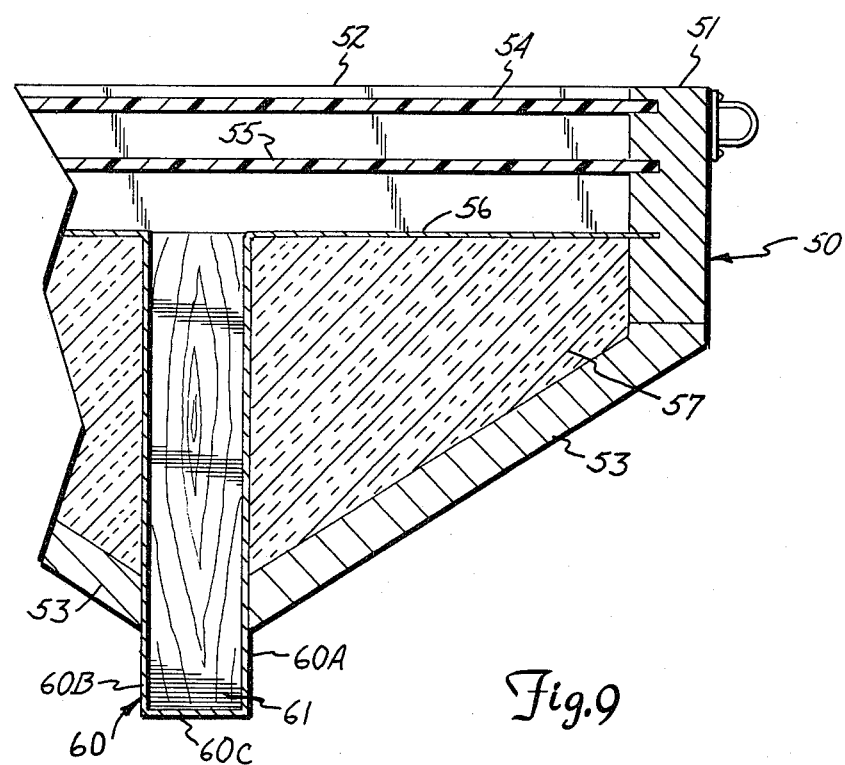
FIG. 9 is a sectional view of a modified form of the collector taken as on the same line as FIG. 4.

The solar powered ice melter comprises a solar collector 10 mounted on a roof 9 of a building, and has an exterior housing 11 including upright walls 12 and 13, and end walls 14 that are joined to form an enclosure. As can be seen, the side walls 12 and 13 are elongated along a longitudinal axis. The housing 11 also includes a bottom wall 15 joined to the side walls. The length and width of the housing can be varied as desired, to suit the installation contemplated.

An absorber plate 20 is mounted on the interior of the housing 11, below a pair of glazing panels 21 and 22, which are radiant energy transparent. The use of double glazing panels as shown provides a dead air space indicated at 23 between the panels for insulation purposes. The panels 21 and 22 can be glass, plexiglass, or other suitable plastic. The panels 21 and 22 must be radiant energy transparent to permit the radiant energy such as sunlight to pass through and strike the absorber plate 20.

As shown, an insulation layer 25 is provided between the absorber plate 20 and the bottom wall 15 along the major portions of the absorber plates. Insulation layers also can be provided along the interior of the side walls 12 and 13, if desired, to insure that the interior temperature of the collector gets quite high and a great deal of heat is not conducted out through the side walls 12 and 13.

The absorber plate 20 has an upward facing surface that may be a black surface for efficient absorption of solar energy and conversion to heat. Radiation absorbing coating of various types may be used. A conductor rib 26, which extends through the bottom wall 15, is in heat conducting relationship to the absorber plate and when the collector is mounted on a roof, the conductor rib is in contact with the roof 9. The conductor rib 26, in the form shown, is a channel formed directly in the metal absorber plate, and extends outwardly through the wall 15 a sufficient distance to protrude and engage a support surface. The conductor rib 26 can be made of solid metal material, thermally connected to the absorber plate 20. It is important that means are provided to conduct heat from the plate 20 to the portions of the conductor rib 26 which protrude from bottom wall 15.

The housing 11 is elongated sufficiently so that one end of the housing protrudes over the edges of the roof a desired amount, as shown in FIG. 1, and spans the overhang (the slant length) of the roof. If gutters are used, the longitudinal shape of the housing can be made to conform to the profile of the gutters and roof line so the conductor rib rests on the roof and across the top of the gutters.

The conductor rib 26, as mentioned, is a channel-shaped member that is formed from the same sheet as absorber plate 20, and at each end of the channel a wood block 27 is mounted to aid in maintaining the channel in proper shape and insure an airtight collector enclosure. The plate 20 is thin sheet metal and conducts heat to the rib walls 26A, 26B and 26C. The convection of heated air to the rib is also important and thus the rib should be wide enough to permit air to flow by convection into the rib. Heat is conducted to objects in contact with the rib exterior surfaces. For example, ice shown at 30 can build up adjacent the roof edges as previously explained. The collector of the present invention can either be installed after there is some initial build-up, or before there is any build-up, and any snow or ice that contacts the conductor rib 26 will be melted by the heat from absorber plate 20 during the time when the sun heats the absorber plate 20 sufficiently.

A first hasp staple 31 is mounted onto one of the side walls adjacent the upper edge, as shown in FIG. 3, and a second hasp staple 32 is mounted adjacent the lower edge of the opposite side wall. The staples or hooks are mounted substantially midway along the longitudinal length of the collector housing, as can be seen in FIG. 5. As shown in FIGS. 5 and 6, a hasp 33 which is an ordinary hinged hasp, has a section 34 that attaches to the roof 9, and has a portion 35 that hinges relative to the section 34. The hasp portion 35 in the form of the invention shown has two openings to selectively receive the hasp staples 31 and 32. When the staple 31 is in the upper one of the openings on hasp portion 35, the collector 10 is held in a position wherein the plane of the absorber plate 20 is substantially parallel to the roof 9. If desired, the same staple 31 can be placed in the lower opening on the portion 35 to tilt the collector assembly so that the plane of the absorber plate 20 is inclined toward the sun as shown in FIG. 7.

By turning the collector end for end, that is rotating it 180°, the staple 32 (which is adjacent bottom wall 14) can be placed in the upper one of the openings in hasp portion 35, and this will incline the collector, and in particular the plane of the absorber plate 20, in the opposite direction if this is desired for facing the absorber toward the sun.

In actual use, the length of the collector assembly can be selected as desired, and generally a length in the range of thirty inches will be satisfactory. Such length extends across the roof overhang slant length of a home with a twenty-four inch overhang. A width generally ranging in an overall width of ten inches or less (preferably one-sixth to one-third of the length) has also been found to be easy to handle and easy to use, and yet provide adequate area on the absorber plate for absorption of sufficient solar energy to raise the temperature of the conductor rib 26 high enough to cause melting of ice on the roof even when the temperatures are quite cold. The width of the rib may also be reduced, which would tend to concentrate the heat from absorber plate 26 in a smaller area.

In a modified form of the invention shown in FIG. 9, a rib which protrudes from the absorber plate more than the rib in FIGS. 1-8 is shown. The collector housing also is modified. The housing 50 has side walls and end walls 51 and 52 corresponding to walls 12, 13 and 14 of housing 11, except the end walls 52 are made to conform to the slope of bottom wall 53. Bottom wall 53 is made in two sections, each of which joins a side wall 51 and tapers toward the center of the housing 50.

A pair of glazing panels 54 and 55 are utilized as before. The solar energy absorber plate 55 in this form of the invention is also mounted to the side walls and in this form of the invention is supported on a layer of insulation 57 that fills the space between the bottom wall 53 and the absorber plate.

A conductor rib 60 is formed from the same sheet as absorber plate 56. The conductor rib is formed as a channel having side walls 60A and 60B and a bottom wall 60C.

Support and insulation blocks 61 also are used adjacent the ends of the channel forming conductor rib 60.

The conductor rib 60 has greater depth than rib 26 in the previous form of the invention. The bottom wall of the rib thus extends outwardly a greater amount from the plane defined by the lower edges of the side walls 51 of the housing 50. The collector housing and the plane of absorber plate 56 thus rest normally at a greater angle with respect to the horizontal than the previous form, thereby normally inclining the absorber plate 56 more toward the sun particularly when the sun stays low in the sky, as in the winter months.

The conductor rib 60 protrudes out from bottom wall 53 so any ice or snow contacting the exterior parts of the conductor rib will be melted when the absorber is in sunshine. The insulation 57 along the sides of the rib prevents excessive heat loss and thus only the exposed portion of conductor rib 60 will dissipate significant heat to melt ice and snow.

The rib 60 protrudes from the plane of absorber plate 56 about 30% to 50% of the width of the housing and is wide enough to permit convective flow of heated air into the rib. When housing 50 rests on the exposed part of rib 60 and one longitudinal edge of the housing it inclines about 30° from horizontal.

The bottom wall 53 also provides support and if the collector housing is placed in snow, the wall 53 may be supported directly on the snow. The exposed portion of the conductor rib 60 will melt the ice or snow in contact with it to maintain an open channel for drainage.

The means to secure the housing 11 to a roof also can be used with the unit shown in FIG. 9.

The collector thus is quite easy to make, and actually can be constructed of wood for the side walls and bottom wall, with a suitable metal heat conductor rib and absorber plate.

If a solid conductor rib is utilized, it must be in good thermal contact with the absorber plate to insure that the heat is conducted to the rib and outside of the housing to cause melting of a channel in roof ice ridges.

In accordance with normal practice with solar collectors, the absorber plate can be coated with a suitable radiant energy absorbing paint or other material. Usually the collector plates are painted black, and the inside of the walls for the housing and the inner surfaces of the channels forming ribs 26 or 60 can also be painted black.

Further, if desired, the ribs 26 or 60 can be offset from the center of the absorber plate. However, the conductor rib must have an exterior or exposed surface which melts a channel or path in ice and snow. The collector can be placed easily in any desired location such as in roof valleys, as well as adjacent the edges of the roof. The collector also can be used to provide drain channels through ice collecting on walls or driveways.

Thus, the solar collector is readily made, easily portable, and low in cost. Particularly, the operational costs are for all practical purposes zero, and there is no need to run power cords or in any other way have to solve the problems raised by using electrically powered roof ice melters. If desired, a packet 40 of a suitable dessicant (FIG. 4) can be placed between the glazing panels 21 and 22 to keep moisture from condensing on the glazing panels 21 and 22.

Of course, various designs of absorber plates can be utilized, and in particular, known focusing type absorbers can be utilized. Thus, the present invention is not restricted to any particular type of absorber, nor to any particular method of constructing the outer housing.

What is claimed is:

1. A portable solar collector for melting ice and preventing ice formation along a path down a sloping supporting surface on which the collector is mounted comprising a housing with a bottom wall, means on said housing forming a solar energy absorber with a heat absorbent surface for converting solar energy into heat, and an elongated heat conductor having a rib surface smaller in area than the heat absorbent surface extending to the outside of said housing through an opening in the bottom wall and in heat transfer relationship to said absorber, whereby heat from said absorber is transferred to and concentrated in said conductor, and said rib surface conducts heat to material in contact therewith.

2. The combination as specified in claim 1 wherein said means forming a solar energy absorber comprises a plate type absorber, and said rib is made of a thermally conducting material physically connected in heat conducting relationship to said plate type absorber.

3. The combination as specified in claim 2 wherein said plate type absorber comprises a sheet of metal, and said rib is integrally formed from said sheet metal by forming a U-shaped channel protruding from the general plane of the majority of said sheet, said channel extending through the bottom wall of said housing.

4. The combination as specified in claim 3 wherein said bottom wall tapers from the longitudinal edges of the housing toward the conductor rib in direction away from the absorber, said conductor rib having a portion exposed through the bottom wall adjacent the center portions of the collector housing.

5. The combination as specified in claim 1 further comprising insulation means on the interior of the housing between said absorber and said bottom wall for retaining heat in the housing, the insulation means having an opening corresponding to the opening in the bottom wall so that the heat conductor extends through the opening in the insulation means.

6. The combination as specified in claim 1 and means to retain said housing relative to a supporting surface.

7. The combination as specified in claim 6 wherein said means to retain comprises means cooperating between said support surface and said housing to permit tilting said absorber relative to a horizontal plane in either direction.

8. A portable solar energy collector for melting a drain path in ice on roofs having an overhang portion adjacent an edge of the roof comprising a housing having a longitudinal length selected to extend from adjacent the roof edge a distance substantially spanning the overhand portion of the roof, a solar energy absorber mounted in said housing and facing upwardly when the collector is mounted on a roof with a surface area extending over major portions of the collector, a single heat concentrating conductor means in heat transfer relationship with said absorber, said conductor means having a longitudinal extending edge extending generally downward out of the housing and extending generally centrally along the length of said housing, said housing resting on the edge of the conductor means when in place on the roof with the absorber facing upwardly, whereby the rib means concentrates the heat absorbed by the absorber so that ice along the edge of the conductor means is melted.

9. The portable solar energy collector of claim 8 wherein the width of the housing is substantially in the range of one-sixth to one-third of the housing length.

10. The portable solar energy collector of claim 8 wherein said housing forms a substantially airtight enclosure, and said rib comprises a hollow rib open to the interior of the housing and of sufficient width to permit heated air to enter the rib under convection to transfer heat to the rib.

11. The portable solar energy collector of claim 10 wherein at least portions of the interior surface of the hollow rib are exposed to solar energy and are heated directly by solar energy when the collector is in use.

12. The portable solar heat collector of claim 11 wherein the interior surfaces of the hollow rib are coated with a radiant energy absorbing coating.

* * * * *